No. 649,942. Patented May 22, 1900.
C. J. A. MICHALKE.
SYNCHRONIZER FOR ELECTRIC MACHINES.
(Application filed Dec. 31, 1897.)

(No Model.) 3 Sheets—Sheet 1.

Witnesses,
Inventor
Carl Joseph August Michalke,
By Bantow Brown
Attorneys.

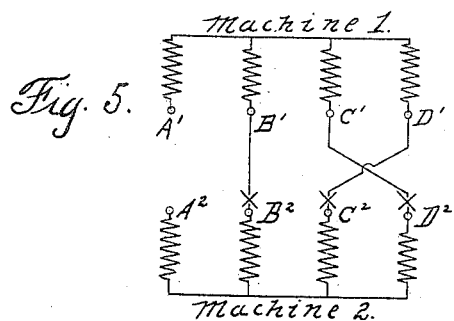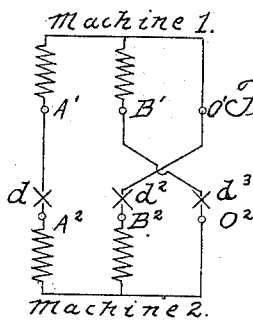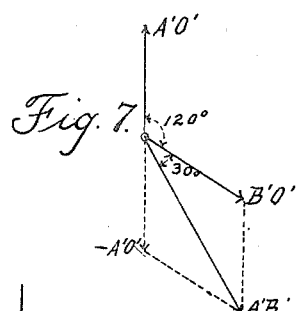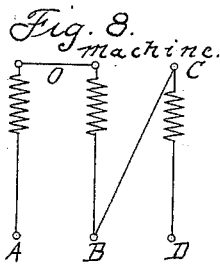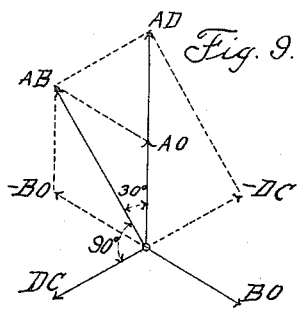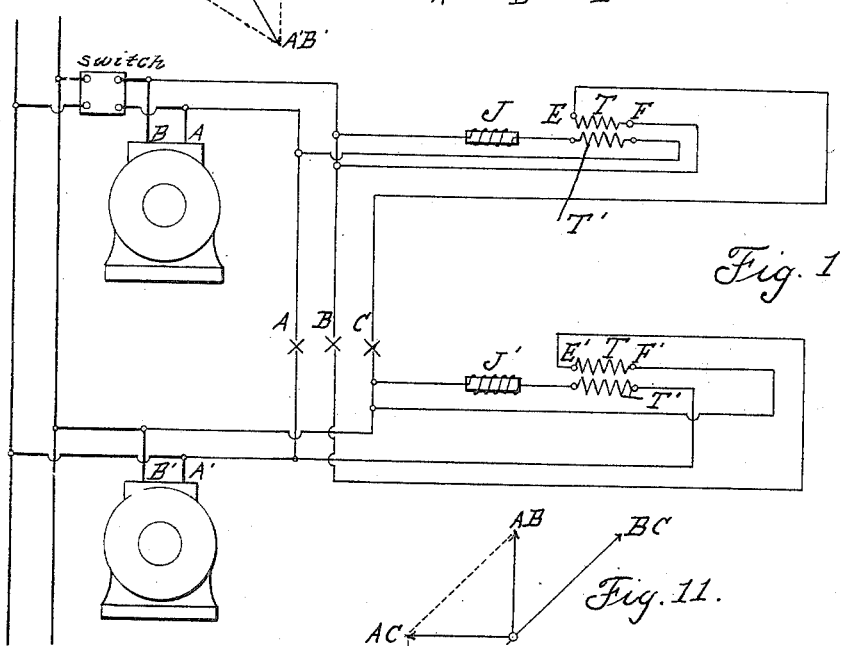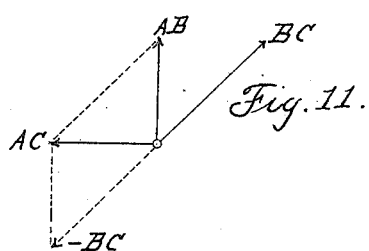

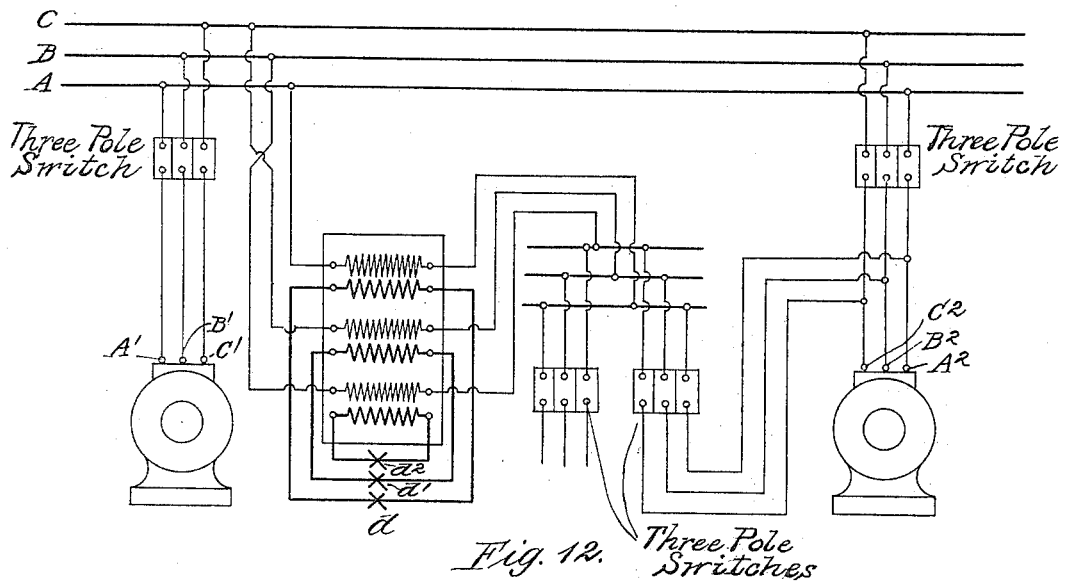
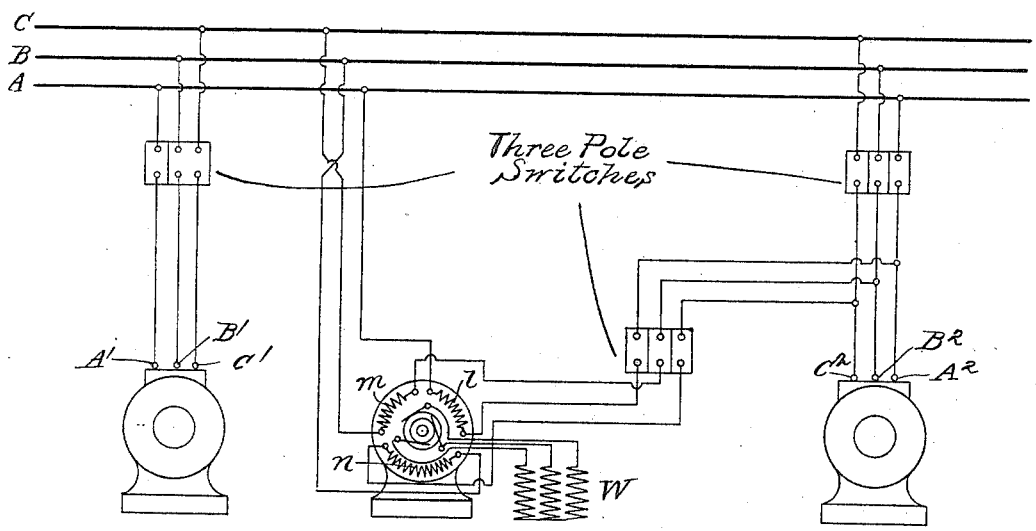

UNITED STATES PATENT OFFICE.

CARL JOSEPH AUGUST MICHALKE, OF CHARLOTTENBURG, GERMANY, ASSIGNOR TO THE SIEMENS & HALSKE ELECTRIC COMPANY OF AMERICA, OF CHICAGO, ILLINOIS.

SYNCHRONIZER FOR ELECTRIC MACHINES.

SPECIFICATION forming part of Letters Patent No. 649,942, dated May 22, 1900.

Application filed December 31, 1897. Serial No. 665,183. (No model.)

*To all whom it may concern:*

Be it known that I, CARL JOSEPH AUGUST MICHALKE, a subject of the Emperor of Germany, residing at Charlottenburg, Germany, have invented new and useful Improvements in Synchronizers for Electric Machines, (Case No. 74,) of which the following is a specification, reference being had to the accompanying drawings, forming a part of this specification, for which Letters Patent have been granted in Germany, No. 91,550, dated November 3, 1895; in Great Britain, No. 2,772/96, dated February 6, 1896; in Italy, No. 40,778, dated March 12, 1896; in France, No. 253,722, dated February 5, 1896; in Switzerland, No. 11,790, dated January 29, 1896; in Sweden, No. 7,948, dated January 30, 1896, and in Austria, No. 46/3,356, dated August 30, 1896.

This invention relates to means for indicating the synchronism of two or more alternating or rotary current machines which are to be switched into parallel.

In order to recognize the synchronism of machines which are to be switched into parallel, incandescent lamps have generally been employed which are connected between corresponding terminals of the two machines, whereby the extinguishment of the incandescent lamps furnishes an indication that the machines are in synchronism, while the continued flashing of the lamps shows that the machines are not in synchronism. This arrangement is objectionable, due to the fact that it is impossible to tell whether the machine to be switched into circuit in its asynchronic operation is running too fast or too slow, since in either case the fact of the asynchronism is indicated by the alternate flashing and extinguishment of the lamps. This renders the parallel switching considerably more difficult and dilatory, as it cannot be determined in which direction the speed of rotation of the machine is to be regulated.

The present invention relates to a simple and effective device whereby when the machine to be switched into circuit is running asynchronously an indication will be made as to whether it is running too fast or too slow, while a different indication will be made when the machine becomes synchronous.

I have illustrated my invention in the accompanying drawings, in which—

Figure 1:
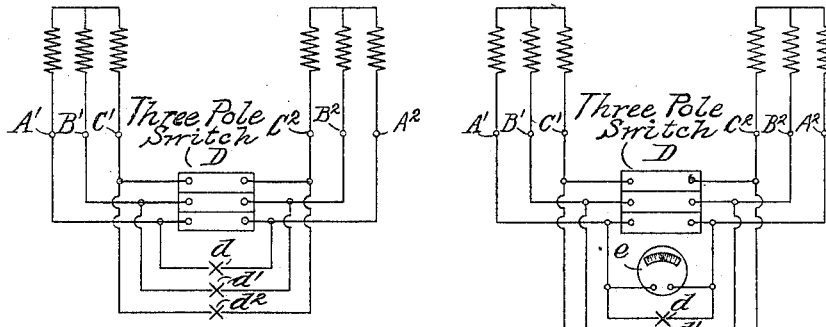
Figure 2:
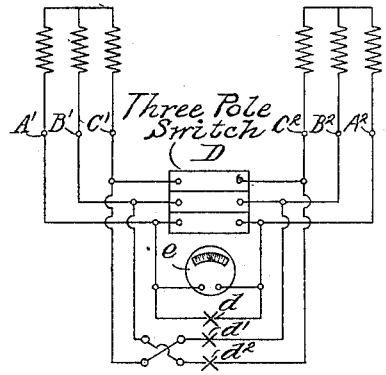
Figure 3:
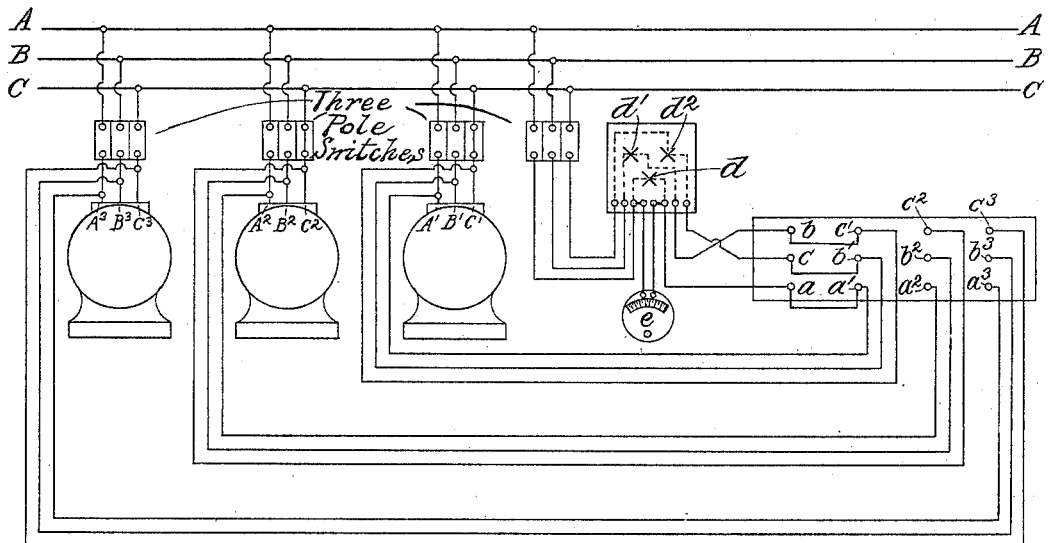
Figure 4:
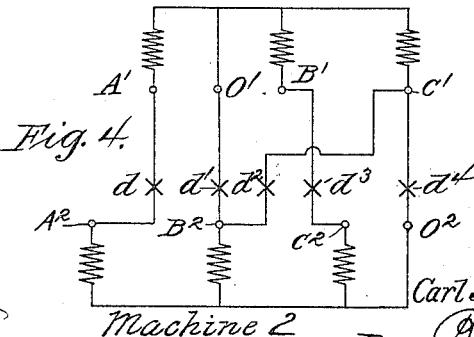

Figure 1 is a diagram illustrating the prior art. Fig. 2 is a diagram illustrating the device of the present invention. Fig. 3 illustrates the device as applied to three machines. Fig. 4 is a diagram illustrating the manner in which additional lamps may be connected in circuit. Figs. 5 and 6 illustrate the application of the present invention to single-phase alternating-current machines. Fig. 7 is a diagram showing the electromotive forces developed in the device of Fig. 6. Fig. 8 is a further modification applicable to single-phase alternating-current machines. Fig. 9 is a diagram of the electromotive forces therein. Fig. 10 is a diagram illustrating the present invention in the form of an auxiliary appliance. Fig. 11 is a diagram of the electromotive forces produced therein. Fig. 12 is a view of a modification wherein the lamps or responsive devices are included in the secondary circuits of transformers. Fig. 13 is a view wherein the indicator or responsive device is in the form of an electric motor.

Like letters indicate like parts throughout the different views.

In Fig. 1 the nature of the indicator of the prior art is illustrated. The first machine is provided with three terminals $A'$ $B'$ $C'$ and the second machine with three terminals $A^2$ $B^2$ $C^2$. The incandescent lamps $d$ $d'$ $d^2$, represented in the drawings by crosses, are switched between corresponding terminals of the machines—that is, between the terminals $A'$ and $A^2$, $B'$ and $B^2$, and $C'$ and $C^2$, respectively. By closing the three-pole switch D the machine can be switched into parallel, provided the potentials at the terminals $A'$ and $A^2$, $B'$ and $B^2$, and $C'$ and $C^2$ coincide. The fact that the machines are in synchronism is indicated by the incandescent lamps being extinguished. During asynchronic operation the lamps alternately flash and darken at intervals corresponding to the difference of the rotations.

Fig. 2 illustrates the connections of the lamps in accordance with the present invention. The lamps are not connected between corresponding terminals of the two machines. One lamp $d$ is connected between the corresponding terminals $A'$ $A^2$ of the machines. The lamp $d'$ is connected between the terminals $C'$ and $B^2$, while the lamp $d^2$ is connected between the terminals B' and C². In consequence the lamps will not flash simultaneously during asynchronic operation, but will flash one after another. The succession or order in which the flashing of the lamps takes place will depend upon whether the machine which is to be switched into circuit runs faster than the other machine or slower. Consequently the direction or order in which the lamps flash furnishes a criterion to determine whether the machine runs too fast or too slow. The direction of the flashing of the lamps being once determined, it may be readily ascertained thereafter whether any particular machine is running too fast or too slow. When the machines are running in synchronism, the lamp $d$, which is connected between the corresponding terminals A' A², will be extinguished and the machines may then be switched into circuit together. At synchronism the lamps $d'$ $d^2$ will be found to burn with about one-half of their normal brilliancy. In order to fix the moment of synchronism in a still more sensitive manner, a volt-meter or potential-indicator $e$ may be placed in parallel with the lamp $d$.

The incandescent lamps may be replaced where desired by other tension-indicators—as, for instance, a series of volt-meters. Likewise the lamps may be used with transformed currents, as will be hereinafter explained.

In Fig. 3 the indicator is illustrated as adapted for a system of three or more machines adapted to be switched into parallel. The several machines are connected between the bars or rails A, B, and C. Terminals $a$, $b$, and $c$ are connected with the respective rails through conductors including the lamps $d$ $d'$ $d^2$, which are preferably arranged in a circle, so that the direction of the flashing may be easily distinguished. A series of terminals $a'$ $b'$ $c'$ $a^2$ $b^2$ $c^2$ $a^3$ $b^3$ $c^3$ is provided for each of the machines, and the phase-indicator may be connected in circuit with any of the machines by moving the contacts $a$ $b$ $c$ into contact with any one of the series $a'$ $b'$ $c'$, &c., this switching being accomplished by a three-pole switch-plug or in any other convenient manner. A volt-meter $e$ is illustrated as connected in parallel with the lamp $d$.

In order to further accentuate the direction in which the lamps flash one after the other, more than three lamps may be employed. This may be accomplished on machines with star connection by using in addition to the tensions between the several coils of the winding the tensions from the several terminals of the coils to the zero-point. In Fig. 4 is illustrated such a connection. The lamp $d$ is connected between the corresponding terminals A' A², while the lamps $d'$ $d^2$ $d^3$ $d^4$ are connected between the points O' B², B² C', B' C², and C' O², the points O' and O² being the zero-points of the two machines. The lamps between the points A' A², B' C², B² C' have equal tensions between the same or between each other, as have also the lamps between the points B² O' and C' O²; but the tensions in the first instance bear the proportion to the tensions in the second instance of $\sqrt{3}$ to 1. Therefore lamps for different tensions must be selected in this arrangement.

The arrangement described above as illustrating a three-phase machine may also be used where there are more than three phases as well as where there are less. In Fig. 5 the indicator is illustrated with a two-phase machine with star connection for three lamps. The lamp between the points B' B² is the phase-indicator.

The above-described indicator cannot be used for the parallel switching of single-current machines in all cases, since three incandescent-lamp circuits having relatively-displaced phases are required in order to indicate the direction of flashing. The arrangement may be used, however, in single-current machines, provided three currents of different phases can be taken therefrom. It is not necessary that the currents should differ by one hundred and twenty degrees in phase.

With alternating-current machines wherein the terminal tension may be divided into two tensions of relatively-displaced phase the above method is applicable by employing the zero conductor for obtaining the third phase. Thus in Fig. 6 the terminals of one alternating-current machine are represented by the letters A' B', while the terminals of the other machine are represented by the letters A² B². The voltage of current in coils A and B having a displacement of one hundred and twenty degrees from each other, the terminal pressure A' B' may be resolved into two components A' O' and B' O', which are one hundred and twenty degrees apart, by leading a common conductor O' from a correctly-chosen point, which should be the neutral point, in the winding A' B'. Similarly the terminal pressure A² B² can likewise be resolved into two components one hundred and twenty degrees apart, the voltage of current in corresponding coils being displaced one hundred and twenty degrees from each other. It is not necessary, as stated above, that all three currents be one hundred and twenty degrees apart. One lamp $d$ is placed between the corresponding terminals A' A², another lamp $d^2$ between the terminals B² and the zero conductor O', and another lamp $d^3$ between the terminal B' and the zero conductor O². The relation between the tensions will then be as follows:

$$A' B' = E.$$

$$A' O' = \frac{E}{\sqrt{3}}.$$

$$B' O' = \frac{E}{\sqrt{3}}.$$

In Fig. 7 the values of the tensions and also the phase displacements are illustrated. A' O' is displaced one hundred and twenty degrees relatively to B' O', and B' O' is displaced thirty degrees from A' B'. The experiment shows, despite the insignificant displacement of B' O' toward A' B', the direction of the flashing of the incandescent lamps and also accomplishes the extinguishment of the lamp $d$ when synchronism prevails. The incandescent lamps must be chosen for different tensions similar to the tensions explained in connection with Fig. 4.

In alternating-current machines wherein the coils are wound in slots and tensions of different phase are generated in adjoining coils currents of relatively-displaced phase may be obtained by means of an appropriate switching of the main winding or by means of an auxiliary coil laid into one of the slots. Thus by a combination similar to the one represented in Fig. 7 three relatively-displaced phases may be obtained which may be used for the operation of the indicator. When the windings of an alternating-current machine lie in only two-thirds of the slots, while one-third of the slots are left free, an auxiliary coil may be placed in the free slots or in part thereof. This winding will have a phase displaced ninety degrees from the phase of the main winding. The tension of the auxiliary winding may then be combined with the main winding or with a part thereof. The conductors may be used for partial switching in the same manner as represented in Fig. 6. The amplitudes and phase displacements of the different tensions are represented in Fig. 9.

The pressure D C in the auxiliary coil is displaced ninety degrees from the main pressure A B. The two components A O and B O of the main pressure A B are one hundred and twenty degrees apart. The total pressure A D across the terminals A and D is equal to the geometrical combination of the pressures A B and D C and is displaced from the main pressure A B by an angle of thirty degrees.

With alternating - current machines in which it is impossible to take off currents of different phases and also with existing alternating-current machines in which the third conductor cannot be applied the indicator may be used in connection with an auxiliary apparatus, as illustrated in Fig. 10, wherein A and B represent the poles of an alternating-current machine. The induction-coil J and the primary T' of a transformer T are branched off from the machine, the secondary $T^2$ of the induction-coil being connected between the terminal B and a third terminal C. Then the current between terminals A and B will be displaced relatively to the current between the terminals B and C. By the combination of these tensions three terminal tensions A B, B C, and A C may be obtained for employment with the indicator. The induction-coil and the transformer may be built together in a single apparatus, if desired. A condenser may be used in place of the induction-coil where preferable. This is clearly shown in Fig. 11, in which the pressure of the machine is represented by the line A B, the pressure of the transformer by the line B C, and the pressure between the leads A and C by the geometrical difference of the two above-mentioned pressures A B and B C or the line A C. These three out-of-phase pressures operate the lamps of the synchronizer, the generators not being in synchronism.

With rotary-current machines or alternating-current machines for high tension where it is not desirable to switch the tension-indicators, lamps, &c., into the high - tension circuit, transformers may be interposed for reducing the tension. In Fig. 12 I have illustrated an indicator wherein the lamps are included in the secondary circuits of transformers. Thus the lamp $d$ is included in circuit with the secondary of a transformer the primary of which is connected between the terminals A' and $A^2$, while the lamp $d'$ is included in circuit with the secondary of a transformer the primary of which is included between the terminals C' and $B^2$, while the lamp $d^2$ is connected in circuit with the secondary of a transformer of which the primary is included in circuit between the terminals B' and $C^2$.

Instead of the incandescent lamps or voltmeters an electric motor may be employed as an indicator, the motor-armature turning to the right or left, according as the machine to be switched into circuit is running fast or slow. When synchronism obtains, the motor stops or vacillates almost imperceptibly from a position of rest. In Fig. 13 is illustrated a motor connected in circuit for this purpose. The motor is illustrated as having three windings $l$, $m$, and $n$, the winding $l$ being connected between the terminals A' $A^2$, the winding $m$ between the terminals C' $B^2$, and the winding $n$ between the terminals B' $C^2$. The armature of the motor is illustrated as provided with an external resistance W, connected in circuit through sliding rings and brushes.

The above - described arrangements, particularly those serving for the parallel switching of single or multi-phase alternating-current machines, may evidently be employed for other purposes where the recognition of the synchronism of machines or of parts of machines is the object. The indicator may, for instance, be employed in the starting of synchronous motors. The incandescent lamps or the coils of the motor may thus be employed to determine whether or not machines that are to be connected in parallel are in synchronism and each set of lamps or each set of coils constitutes a synchronism-indicator, the coils or the lamps being members of the indicator, some of which are connected between points between which there is a difference in potential, and at least one of which is preferably connected between points between which there is no difference in potential when the connected machines are running at the same speed. When the machines are running at unequal speeds, then a difference in potential arises between those points between which there normally should be no difference in potential, and the potential difference between the remaining connected points rises or varies. When the machines are brought to the proper state of synchronism, they are switched in parallel.

Where the device of my present invention is to be employed in synchronizing motors, the motors do not act in their capacity as motors to operate the device, but more in the nature of generators. I do not wish to be limited in all embodiments of the invention to the inclusion of the third member of the synchronism-indicating device between terminals between which there is no difference of potential when machines operate in synchronism.

Having thus described the invention, what I claim as new, and desire to secure by Letters Patent, is—

1. In a synchronism-indicator, the combination with two or more alternating single-phase or multiphase current machines, each having three or more phase-displaced tensions, of a responsive device connected between points of the machines having equal tension, and two or more responsive devices connected between points of the machines which subject the same to tensions of displaced phases, substantially as described.

2. In a system of alternating-current distribution, the combination with two alternating-current dynamo-electric machines, of a synchronism-indicator having three or more members adapted for connection between terminals of the machines, some of the terminals thus connected having no difference in potential between the same when the machines are in synchronism, said connections intermittently affording a difference in potential between all connected terminals when the machines are not in synchronism, and means for connecting the machines in parallel with the working conductors, substantially as described.

3. In a system of electrical distribution, the combination with two alternating-current dynamo-electric machines, of a synchronism-indicator having a plurality of members connected or adapted for connection between the said machines, all of which members are adapted by their connections to be successively traversed by currents differing in phase when the machines are not in synchronism, and means for connecting the machines in parallel with the working conductors, substantially as described.

4. In a system of electrical distribution, the combination with two alternating-current dynamo-electric machines, of a synchronism-indicator having a plurality of lamps connected between the said machines, the lamps of the synchronizing instrument being connected between terminals connected with the machines, the connections between these terminals and the connected lamps serving to convey current from the machines of different phase and varying electromotive force when the alternating-current machines are not running in synchronism, whereby the lamps of the synchronizing-indicator are progressively acted upon to indicate the relative speeds of the machines, and means for connecting the machines in parallel with the working conductors, substantially as described.

5. In a system of electrical distribution, the combination with two alternating-current generators, of a synchronism-indicator having a plurality of members connected between the said generators, members of the synchronizing instrument being connected between terminals connected with the generators, the connections between these terminals and the connected members of the instrument serving to convey current from the generators of different phase and varying electromotive force when the alternating-current generators are not running in synchronism, whereby the members of the synchronizing-indicator are progressively acted upon to indicate the relative speeds of the generator, and means for connecting the generators in parallel with the working conductors, substantially as described.

6. The combination with two alternating-current dynamo-electric machines, each supplying out-of-phase currents, of a synchronism-indicator having three members connected between the machines, thereby to be traversed by alternating currents varying in voltage and differing in phase when the machines are not in synchronism, and means for connecting the machines in parallel with the working conductors, substantially as described.

7. The combination with two alternating-current dynamo-electric machines, each supplying out-of-phase currents, of a synchronism-indicator having three members, two of which are connected between the machines, thereby to be traversed by alternating currents varying in voltage and differing in phase when the machines are not in synchronism, the third member of the indicator being connected in circuit between the machines with points between which there is substantially no difference of potential when the machines are in synchronism and between which points there is a difference of potential when the machines are not in synchronism, and means for connecting the machines in parallel with the working conductors, substantially as described.

In testimony whereof I affix my signature in the presence of two witnesses.

CARL JOSEPH AUGUST MICHALKE.

Witnesses:
JOHANNES GÖRGES,
PAUL ROEDIGER.